(12) United States Patent
Tsai et al.

(10) Patent No.: US 6,377,362 B1
(45) Date of Patent: Apr. 23, 2002

(54) METHOD AND APPARATUS FOR OBTAINING MAGNIFICATION ERROR FOR IMAGE SCANNING APPARATUS

(75) Inventors: Jenn-Tsair Tsai; Bill Chen, both of Hsinchu (TW)

(73) Assignee: Mustek Systems, Inc. (TW)

( * ) Notice: Subject to any disclaimer, the term of this patent is extended or adjusted under 35 U.S.C. 154(b) by 0 days.

(21) Appl. No.: 09/213,987

(22) Filed: Dec. 17, 1998

(30) Foreign Application Priority Data

May 20, 1998 (TW) .......................................... 87107862

(51) Int. Cl.[7] ................................................. H04P 1/00
(52) U.S. Cl. ........................................ 358/406; 358/463
(58) Field of Search ................................ 358/474, 463, 358/464, 504, 406

(56) References Cited

U.S. PATENT DOCUMENTS 5,130,525 A * 7/1992 Ryon ....................... 250/208.1
5,267,053 A * 11/1993 Potucek ...................... 358/446
5,452,112 A * 9/1995 Wan ........................... 358/504
5,589,951 A * 12/1996 Woydich .................... 358/473
6,009,292 A * 12/1999 Jinbo et al. ................. 399/208

FOREIGN PATENT DOCUMENTS

EP 0363983 A2 * 4/1990 .......... G03G/15/04
JP 01291270 A * 11/1989 .......... G03G/15/04

* cited by examiner

Primary Examiner—Jerome Grant, II
(74) Attorney, Agent, or Firm—Madson & Metcalf

(57) ABSTRACT

A method and an apparatus for obtaining a magnification error in a first direction for an image scanning apparatus is disclosed. The method includes steps of (a) providing a marking pattern having a particular length in the first direction, (b) scanning the marking pattern to obtain a scanning length in the first direction, and (c) calculating the magnification error in the first direction from scanning length and the particular length.

20 Claims, 3 Drawing Sheets

METHOD AND APPARATUS FOR OBTAINING MAGNIFICATION ERROR FOR IMAGE SCANNING APPARATUS

FIELD OF THE INVENTION

The present invention relates to a method and an apparatus for obtaining a magnification error in a first direction, and particularly to a method and an apparatus for obtaining a magnification error in the longitudinal direction for an image scanning apparatus.

BACKGROUND OF THE INVENTION

In recent years, an image scanner has become an indispensable peripheral equipment of personal computers. Many manufacturers are trying their best to improve the scanning quality.

In a scanner, the driving device for driving the image-picking device has a mechanical error in the moving direction of the image-picking device (or the longitudinal direction). For a scanner with a resolution of 600 dots per inch (DPI), the image-picking device driven by the driving device will move 6000 steps for scanning a document with a length of 10 inches to obtain an image having 6000 dots in length. However, due to above-described error, the image-picking device must move 6060 steps to finish the scanning process so that the actual length of the scanned image is up to 6060 dots, resulting in that the length of the scanned image changes from 10 inches to 10.1 inches.

Therefore, it is desirable to provide a method and an apparatus for obtaining a magnification error in the longitudinal directions to improve the scanning quality.

SUMMARY OF THE INVENTION

An object of the present invention is to provide a method for obtaining a magnification error in a first direction for an image scanning apparatus. The method includes steps of (a) providing a marking pattern having a particular length in the first direction, (b) scanning the marking pattern to obtain a scanning length in the first direction, and (c) calculating the magnification error in the first direction from the scanning length and the particular length.

According to the present invention, the marking pattern is mounted on one side of an object to be scanned and the marking pattern further includes a rectangular pattern with a first color and a background with a second color. Preferably, the first color and the second color are black and white respectively. The marking pattern further includes a plurality of spaced rectangular patterns and a background. Besides, the step (b) is executed by an image-picking device. The marking pattern intersects with a moving path of the image-picking device. In addition, the first direction is a moving direction of the image-picking device driven by a driving device, that is, a longitudinal direction. The driving device is connected with the image-picking device for driving the image-picking device to scan in the first direction.

Another object of the present invention is to provide an image scanning apparatus obtaining a magnification error in a first direction. The image scanning apparatus includes an image-picking device for picking digital data representative of an image, a driving device connected to the image-picking device for driving the image-picking device to scan in the first direction, a scanning platform for placing thereon an object to be scanned, and a marking pattern having a particular length in the first direction on the scanning platform.

In accordance with the present invention, the image scanning apparatus is one selected from a group consisting of an image scanner, a photocopier, and a fax machine. The image-picking device is preferably a charge coupled device (CCD). In addition, the first direction is a moving direction or a longitudinal direction of the image-picking device driven by the driving device.

The present invention may best be understood through the following description with reference to the accompanying drawings, in which:

DETAILED DESCRIPTION OF THE PREFERRED EMBODIMENTS

Figure 1:
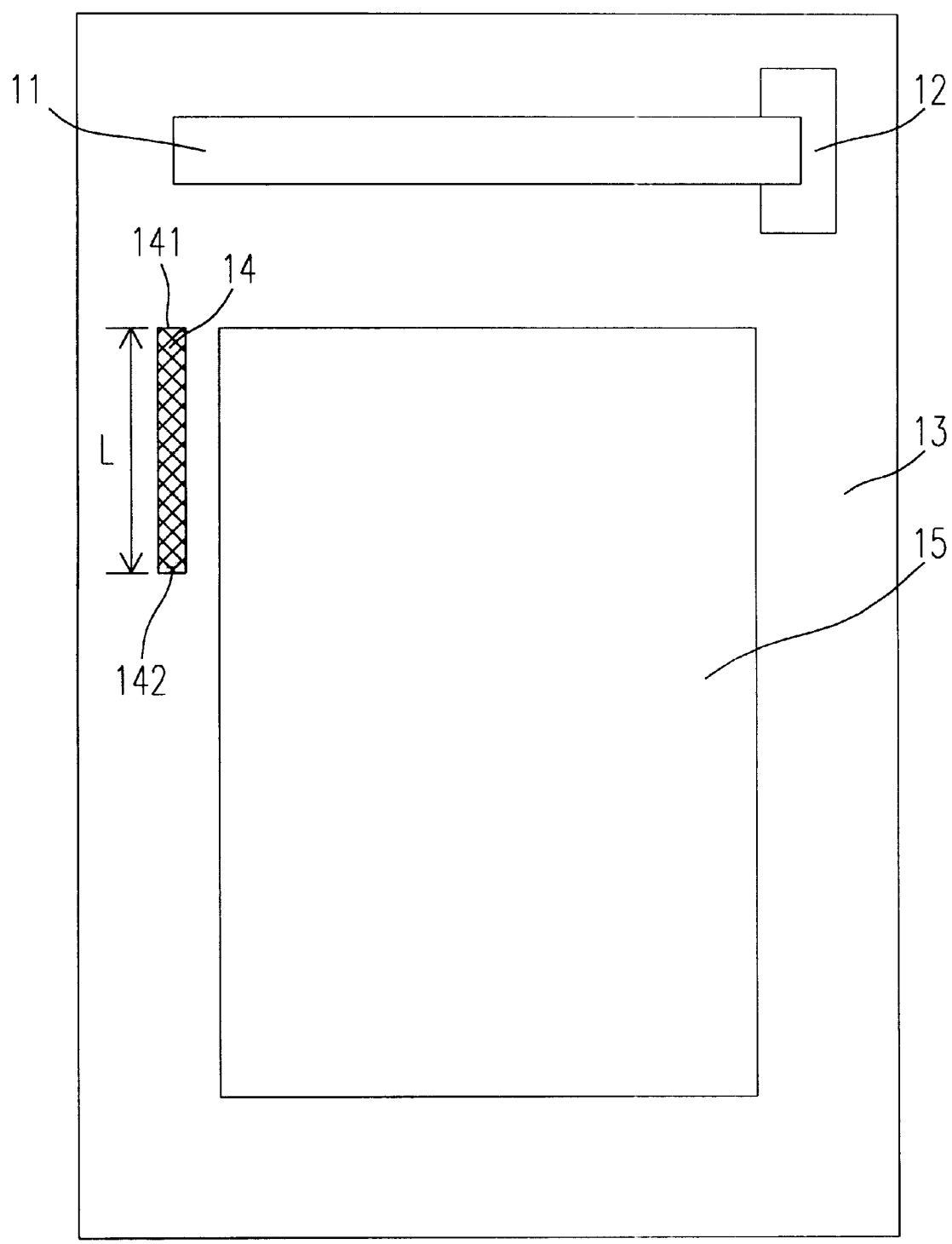
FIG. 1 schematically shows a preferred embodiment of an scanning apparatus according to the present invention.

Please refer to FIG. 1 showing a preferred embodiment of an image scanning apparatus. The image-picking device 11 is used for picking digital data representative of an image and the driving device 12 is connected to the image-picking device 11 for driving the image-picking device 11 to scan in a first direction. The scanning platform 13 is for placing thereon an object 15 to be scanned and the marking pattern 14 has a particular length in the first direction. The marking pattern is usually mounted on the side of the object 15 to be scanned and has a color for being easily distinguished from the background.

While the driving device 12 drives the image-picking device 11 to scan the object 15, the marking pattern 14 is also scanned. Take the rectangular marking pattern, as shown in FIG. 1, for example, the rectangular marking pattern has a particular length in the longitudinal direction. When the driving device 12 drives the image-picking device 11 to scan from the top of the marking pattern (line 141) to the bottom of the marking pattern (line 142) in the longitudinal direction, the scanning length is obtained. Therefore, the magnification error can be calculated from the scanning length and the particular length.

Figure 2:
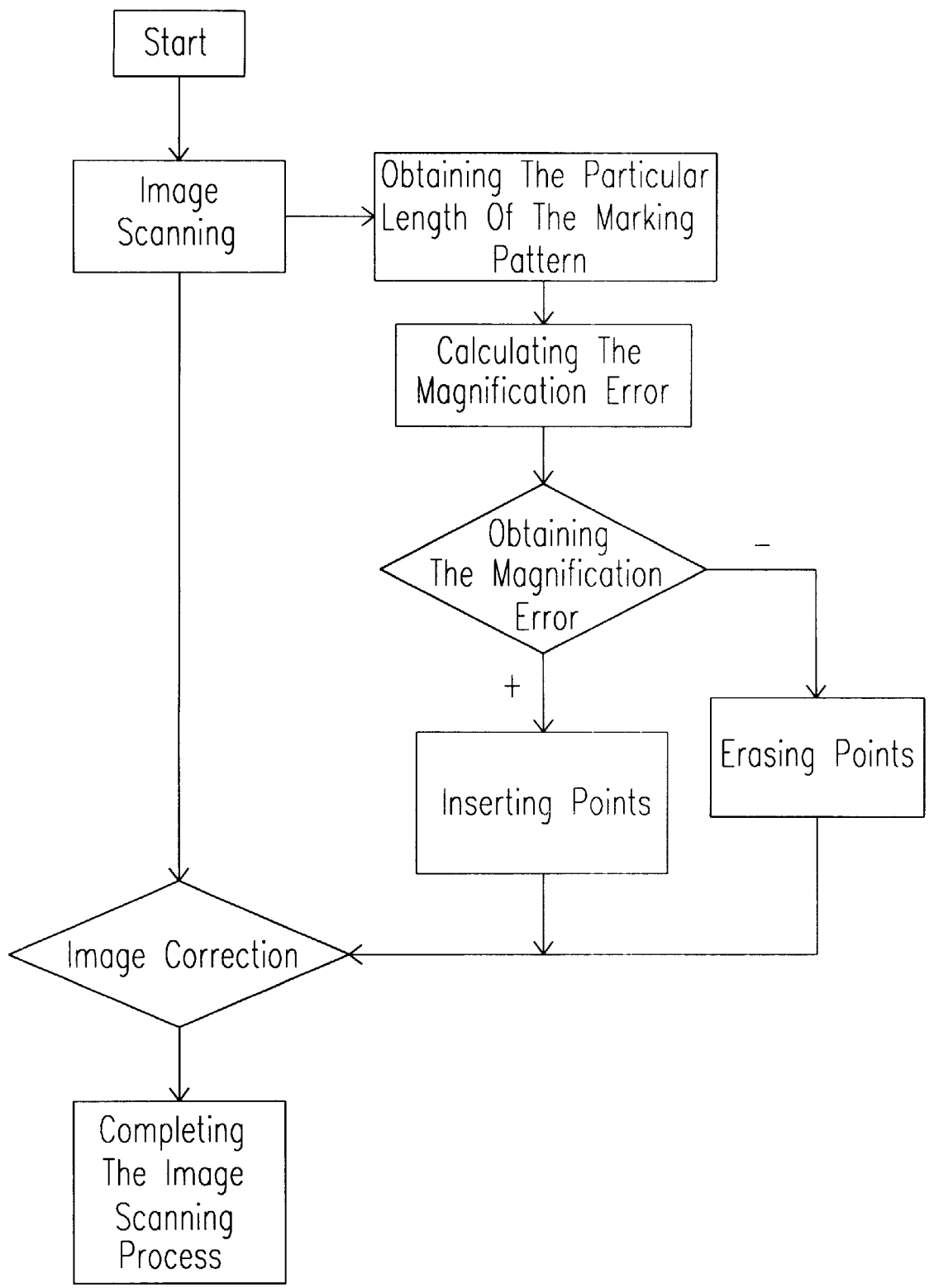
FIG. 2 is a flowchart of the method according to the present invention.

For a scanner with a resolution of 600 dots per inch (DPI), if the particular distance between the line 141 and the line 142 in the longitudinal direction is 2 inches, the driving device should move the image-picking device along the longitudinal direction 1200 steps representative of 1200 dots. However, in fact, the driving device moves the image-picking device 1212 steps so that the magnification error in the longitudinal direction is 1%. The magnification error can be corrected by inserting points or erasing points which are well known for those skilled in the art. The flowchart of the method according to the present invention is shown in FIG. 2.

Preferably, the image-picking device is a charge couple device (CCD). This method can be applied to other devices, such as photocopier and fax machine. The longer the particular length is, the more precise the magnification error is obtained. Therefore, the particular length had better be the same as the length of the object to be scanned.

Figure 3A:
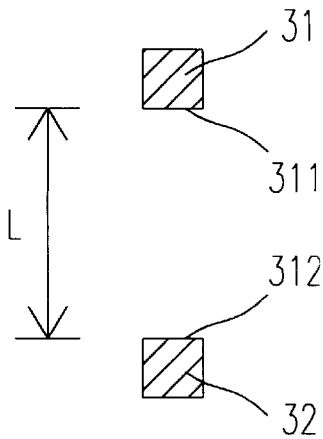
FIGS. 3(a) and (b) are another preferred embodiments of marking patterns according to the present invention.

Please refer to FIG. 3(a) showing another preferred embodiment of the marking pattern. The marking pattern is consisting of two rectangular patterns 31 and 32, and the color of the patterns can be easily distinguished from that of the background, such as black and white. There is a particular distance between the line 311 and 312 in the longitudinal direction. When the driving device 12 drives the image-picking device 11 to scan the object 15, the two black rectangular patterns is also scanned. The magnification error can also be calculated from the scanning length and the particular length.

Figure 3B:
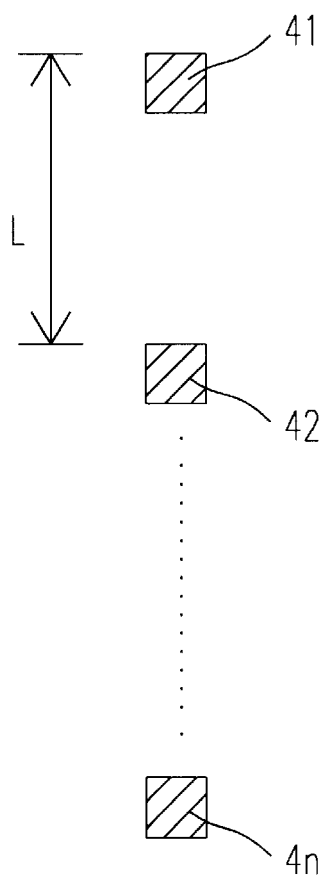

Besides, if the length of the object is know before the scanning process starts, the time for obtaining the magnification error in the longitudinal direction can be saved. For example, if the length of the object to be scanned is 3 inches and has been input by the user, the driving device can drive the image-picking device only 3 inches in the longitudinal direction to finish a scanning process. Certainly, the marking pattern can be designed as shown in FIG. 3(*b*) to adjust different scanning length. The marking pattern in FIG. 3(*b*) is consisting of a plurality of rectangular marking patterns 41, 42, . . . and 4*n*. The spaces between each rectangular pattern is the same. The scanner can get the particular length easily according to the length input by the user. Then, the magnification error can also be calculated from the scanning length and the particular length.

The method for obtaining the magnification error is executed before executing the scanning process and can be applied to an image scanner, a photocopier, or a fax machine. The pattern and the background have different colors which are easily distinguished by the image-picking device. With these methods and apparatus, the magnification errors can be easily rectified to the best state even after being used for a period of time or under the careless operation.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining a magnification error caused by an automatic driving device of a scanned image of an object in a scanning direction for an image scanning apparatus, comprising steps of:

a) providing a marking pattern having a particular length in said scanning direction;

b) scanning said marking pattern along said scanning direction to obtain a scanning length; and c) calculating said magnification error by mathematically operating said scanned length and said particular length.

2. The method according to claim 1 wherein said marking pattern is arranged beside an object to be scanned so that said marking pattern and said object are scanned synchronously.

3. The method according to claim 1 wherein said marking pattern comprises a pattern portion with a first color and said particular length in said scanning direction, and a background portion with a second color contrary to said first color.

4. The method according to claim 3 wherein said first color and said second color are black and white respectively.

5. The method according to claim 4 wherein said pattern portion consists of a plurality of black rectangles spaced by said background portion, and selected two of said black rectangles are said particular length distant from each other.

6. The method according to claim 1 wherein said step (b) is executed by an image-picking device.

7. The method according to claim 6 wherein said scanning direction is a moving direction of said image-picking device driven by a driving device.

8. An image scanning apparatus allowing a magnification error caused by an automatic driving device in a scanning direction to be modified, comprising:

a scanning platform for placing thereon an object to be scanned;

a marking pattern defining a particular length in said scanning direction on said scanning platform;

an image-pickup device for picking data representative of an image of said object, and obtaining a scanned length of said marking pattern in said scanning direction; a driving device connected to said image-picking device for automatically driving said image picking device to move step by step in said scanning direction to scan said object and said marking pattern; and wherein said marking pattern is arranged beside said object on said scanning platform so that said marking pattern and said object are scanned by said image-picking device synchronously.

9. The image scanning apparatus according to claim 8 wherein said marking pattern is mounted on one side of said object to be scanned.

10. The image scanning apparatus according to claim 8 wherein said marking pattern further comprises a rectangular pattern with a first color and a background with a second color.

11. The image scanning apparatus according to claim 10 wherein said first color and said second color are black and white respectively.

12. The image scanning apparatus according to claim 3 wherein said marking pattern further comprises a plurality of spaced rectangular patterns mounted on said scanning platform and a background, and selected two of said rectangular patterns define said particular length.

13. The image scanning apparatus according to claim 8 being one selected from a group consisting of an image scanner, a photocopier, and a facsimile machine.

14. The image scanning apparatus according to claim 8 wherein said image-picking device is a charge coupled device (CCD).

15. The image scanning apparatus according to claim 8 wherein said scanning direction is a moving direction of said image-picking device driven by said driving device.

16. An image scanning apparatus allowing a magnification error caused by an automatic driving device in a scanning direction to be modified, comprising:

a scanning platform for placing thereon an object to be scanned; a plurality of marking patterns attached onto said scanning platform, and equally spaced by a background color in said scanning direction;

an image-picking device for picking and converting an image of said object into digital data, and realizing a scanned length of selected two of said marking patterns in said scanning direction; and a driving device connected to said image-picking device for automatically moving said image-picking device in said scanning direction to pass through said object and said selected two of marking patterns.

17. The image scanning apparatus according to claim 16 wherein said marking patterns are arranged beside said object on said scanning platform so that each of said marking patterns is scanned along with said object by said image-picking device.

18. The image scanning apparatus according to claim 17 wherein said marking patterns are arranged at the same side of said object on said scanning platform so that each of said marking patterns is scanned along with said object by said image-picking device.

19. A method for determining a magnification modifying factor for modifying a magnification error of a scanned image of an object in a scanning direction for an image scanning apparatus, comprising steps of:

providing a plurality of marking patterns equally spaced in said scanning direction;

selecting two of said marking patterns of a particular length therebetween according to the length of said object in said scanning direction;

scanning said object along said scanning direction to realize digital data representative of an image of said object;

scanning said selected two of marking patterns along said scanning direction to realize a scanned length between said two marking patterns; and calculating said magnification modifying factor by mathematically operating said scanned length and said particular length.

20. The method according to claim 19 wherein said marking patterns are arranged beside said object so that said steps of scanning said object and scanning said selected two of marking patterns are performed synchronously.

* * * * *